US012347611B2

(12) United States Patent
Yoshida et al.

(10) Patent No.: US 12,347,611 B2
(45) Date of Patent: Jul. 1, 2025

(54) COIL COMPONENT AND METHOD OF MANUFACTURING THE SAME

(71) Applicant: TAIYO YUDEN CO., LTD., Tokyo (JP)

(72) Inventors: Kazuki Yoshida, Tokyo (JP); Hitoshi Matsuura, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 782 days.

(21) Appl. No.: 17/542,932

(22) Filed: Dec. 6, 2021

(65) Prior Publication Data

US 2022/0208445 A1 Jun. 30, 2022

(30) Foreign Application Priority Data

Dec. 25, 2020 (JP) ................................ 2020-216302

(51) Int. Cl.

| | |
|---|---|
| ***H01F 27/28*** | (2006.01) |
| ***H01F 17/00*** | (2006.01) |
| ***H01F 17/04*** | (2006.01) |
| ***H01F 27/29*** | (2006.01) |
| ***H01F 41/02*** | (2006.01) |

(52) U.S. Cl.

CPC ..... *H01F 41/0246* (2013.01); *H01F 17/0013* (2013.01); *H01F 17/04* (2013.01); *H01F 27/292* (2013.01); *H01F 2017/048* (2013.01)

(58) Field of Classification Search

CPC .. H01F 41/0246; H01F 17/0013; H01F 17/04; H01F 27/292; H01F 2017/048; H01F 1/28; H01F 1/33; H01F 5/04; H01F 27/28; H01F 17/0006; H01F 27/2804; H01F 41/041

USPC ........................................ 336/200, 232, 192

See application file for complete search history.

(56) References Cited

U.S. PATENT DOCUMENTS

| | | | | |
|---|---|---|---|---|
| 2019/0180909 | A1 * | 6/2019 | Shinohara | H01F 27/292 |
| 2019/0244745 | A1 | 8/2019 | Kojima et al. | |
| 2019/0272947 | A1 * | 9/2019 | Uematsu | H01F 27/28 |

FOREIGN PATENT DOCUMENTS

| | | | | |
|---|---|---|---|---|
| JP | 2019-153650 | A | 9/2019 | |
| NO | 2018/088264 | A1 | 5/2018 | |
| WO | WO-2013099297 | A1 * | 7/2013 | H01F 1/0027 |

OTHER PUBLICATIONS

Notice of Reasons for Refusal dated Jul. 30, 2024, issued in corresponding Japanese Patent Application No. 2020-216302, with English translation (13 pgs.).

* cited by examiner

*Primary Examiner* — Shawki S Ismail
*Assistant Examiner* — Kazi S Hossain
(74) *Attorney, Agent, or Firm* — Pillsbury Winthrop Shaw Pittman, LLP

(57) ABSTRACT

A coil component according to one or more embodiments of the invention includes a base body including a plurality of metal magnetic particles, where each metal magnetic particle contains a metal element, a coil conductor including a buried portion provided in the base body and an exposed portion externally exposed through the base body, where the coil conductor is mainly composed of copper, and an insulating oxide layer covering a surface of the buried portion, where the insulating oxide layer contains copper element and an oxide of the metal element contained in the metal magnetic particles.

9 Claims, 6 Drawing Sheets

COIL COMPONENT AND METHOD OF MANUFACTURING THE SAME

CROSS-REFERENCE TO RELATED APPLICATIONS

This application is based on and claims the benefit of priority from Japanese Patent Application Serial No. 2020-216302 (filed on Dec. 25, 2020), the contents of which are hereby incorporated by reference in its entirety.

TECHNICAL FIELD

The present disclosure relates to a coil component and a method of manufacturing the same.

BACKGROUND

A conventional coil component includes a base body made of a magnetic material and a coil conductor provided in the magnetic base body. Recent years have seen the growing use of a large electric current in circuits. This has led to an increase in use of a soft magnetic metal material as a material for the base body of the coil component as the base body made of the soft magnetic metal material is less likely to cause magnetic saturation even with large current flowing therethrough.

Examples of the conventional coil component are disclosed in International Publication No. WO2018/088264 ("the '264 Publication"). The coil component disclosed in the '264 Publication includes a base body containing metal magnetic particles of a soft magnetic metal material and a coil conductor buried in the base body and covered with a polyimide resin.

Japanese Patent Application Publication No. 2019-153650 ("the '650 Publication") discloses another example of the conventional coil component. The coil component disclosed in the '650 Publication includes a base body containing metal magnetic particles of a soft magnetic metal material and a metal plate buried in the base body. The metal plate disclosed in the '650 Publication includes a base material layer made of a conductive metal and a plating layer formed on one of the surfaces of the base material layer.

As disclosed in the '264 Publication, the coil conductor has a surface covered with a resin material such as polyimide, so that the coil component can achieve enhanced dielectric strength. In other words, the resin insulating coating film, which is provided on the surface of the coil conductor, can reduce occurrence of short circuits between the coil conductor and the metal magnetic particles contained in the base body. Since the insulating coating film is made of a non-magnetic resin, however, the coil component may disadvantageously experience compromise of the magnetic characteristics (for example, the inductance) if the resin insulating coating film covers the surface of the coil conductor. Although the '264 Publication discloses that the drop in magnetic characteristics can be prevented by reducing the thickness of the resin insulating coating film to such an extent that the dielectric strength does not excessively drop, the resin insulating coating film on the surface of the coil conductor unavoidably compromise the magnetic characteristics.

Unless the resin insulating coating film covers the surface of the coil conductor, the magnetic characteristics are not compromised by the insulating coating film. If the coil conductor has no resin insulating coating film on the surface thereof, however, short circuits are likely to occur between the coil conductor and the metal magnetic particles. In addition, unless the resin insulating coating film fills the space between the coil conductor and the metal magnetic particles, there are unavoidably voids between the coil conductor and the metal magnetic particles. In this case, while the coil component is in use, oxygen in the voids between the coil conductor and the metal magnetic particles may contribute to oxidization of the coil conductor, which may disadvantageously compromise the electric characteristics of the coil component. In addition, the voids between the coil conductor and the metal magnetic particles may let moisture therein, which may also contribute to the oxidization of the coil conductor.

SUMMARY

An object of the present invention is to solve or relieve at least a part of the above problem. More specifically, one object of the invention disclosed herein is to provide a coil component exhibiting high dielectric strength and excellent resistance against oxidization while compromise of the magnetic characteristics is prevented.

Other objects of the disclosure will be made apparent through the entire description in the specification. The invention disclosed herein may also address any other drawbacks in addition to the above drawback.

According to one or more embodiments of the present invention, a coil component includes a base body including a plurality of metal magnetic particles, where each metal magnetic particle contains a metal element, a coil conductor including a buried portion provided in the base body and an exposed portion externally exposed through the base body, where the coil conductor is mainly made of copper, and an insulating oxide layer covering a surface of the buried portion, where the oxide layer contains copper element and an oxide of the metal element contained in the metal magnetic particles.

In one or more embodiments of the present invention, each of the metal magnetic particles contains a metal element having a higher ionization tendency than copper.

In one or more embodiments of the present invention, each of the metal magnetic particles has an oxide coating film on a surface thereof and binds to an adjacent one of the metal magnetic particles via the oxide coating film.

In one or more embodiments of the present invention, some of the metal magnetic particles are in contact with the coil conductor via the oxide layer and the oxide coating film.

In one or more embodiments of the present invention, the oxide layer contains zinc element.

In one or more embodiments of the present invention, a zinc element content is higher in the oxide layer than in the oxide coating film.

In one or more embodiments of the present invention, an atomic percentage of zinc in the oxide layer is 1.0 at % to 25 at %.

One or more embodiments of the present invention relate to a circuit board including one of the above coil components. One or more embodiments of the present invention relate to an electronic device including the above circuit board.

According to one or more embodiments of the present invention, a method of manufacturing a coil component includes steps of providing an intermediate body including a substrate body and a conductor portion buried in the substrate body, where the substrate body is constituted by a plurality of metal magnetic particles, and the conductor portion is mainly made of copper, heating the intermediate body at a first temperature, so that an oxide film containing copper oxide is formed to cover a surface of the conductor portion, and, after the heating at the first temperature, heating the intermediate body at a second temperature higher than the first temperature to form an oxide coating film containing an oxide of a metal element contained in each of the metal magnetic particles, so that the substrate body is formed into a base body and an insulating oxide layer containing the oxide of the metal element and copper element is formed. The heating at the second temperature reduces at least part of the copper oxide contained in the oxide film.

In one or more embodiments of the present invention, in the heating at the second temperature, the oxide coating film is formed on each of the metal magnetic particles, and each of the metal magnetic particles binds to an adjacent one of the metal magnetic particles via the oxide coating film, so that the base body is formed.

In one or more embodiments of the present invention, the conductor portion is covered with a thermally decomposable insulating coating film, and the insulating coating film is decomposed in the heating at the first temperature.

In one or more embodiments of the present invention, in the heating at the second temperature, the intermediate body is heated within an atmosphere with a lower oxygen concentration than in the heating at the first temperature.

In one or more embodiments of the present invention, the providing of the intermediate body includes applying a suspension containing zinc oxide onto a surface of the conductor portion.

In one or more embodiments of the present invention, in the heating at the second temperature, the oxide layer formed contains zinc oxide.

Advantageous Effects

The invention disclosed herein can provide a coil component exhibiting high dielectric strength and excellent resistance against oxidization while compromise of the magnetic characteristics is prevented.

DESCRIPTION OF THE PREFERRED EMBODIMENTS

The following describes various embodiments of the present invention by referring to the appended drawings as appropriate. The constituents common to more than one drawing are denoted by the same reference signs throughout the drawings. It should be noted that the drawings are not necessarily drawn to an accurate scale for the sake of convenience of explanation. The following embodiments of the present invention do not limit the scope of the claims. The elements described in the following embodiment are not necessarily essential to solve the problem to be solved by the invention.

Figure 1:
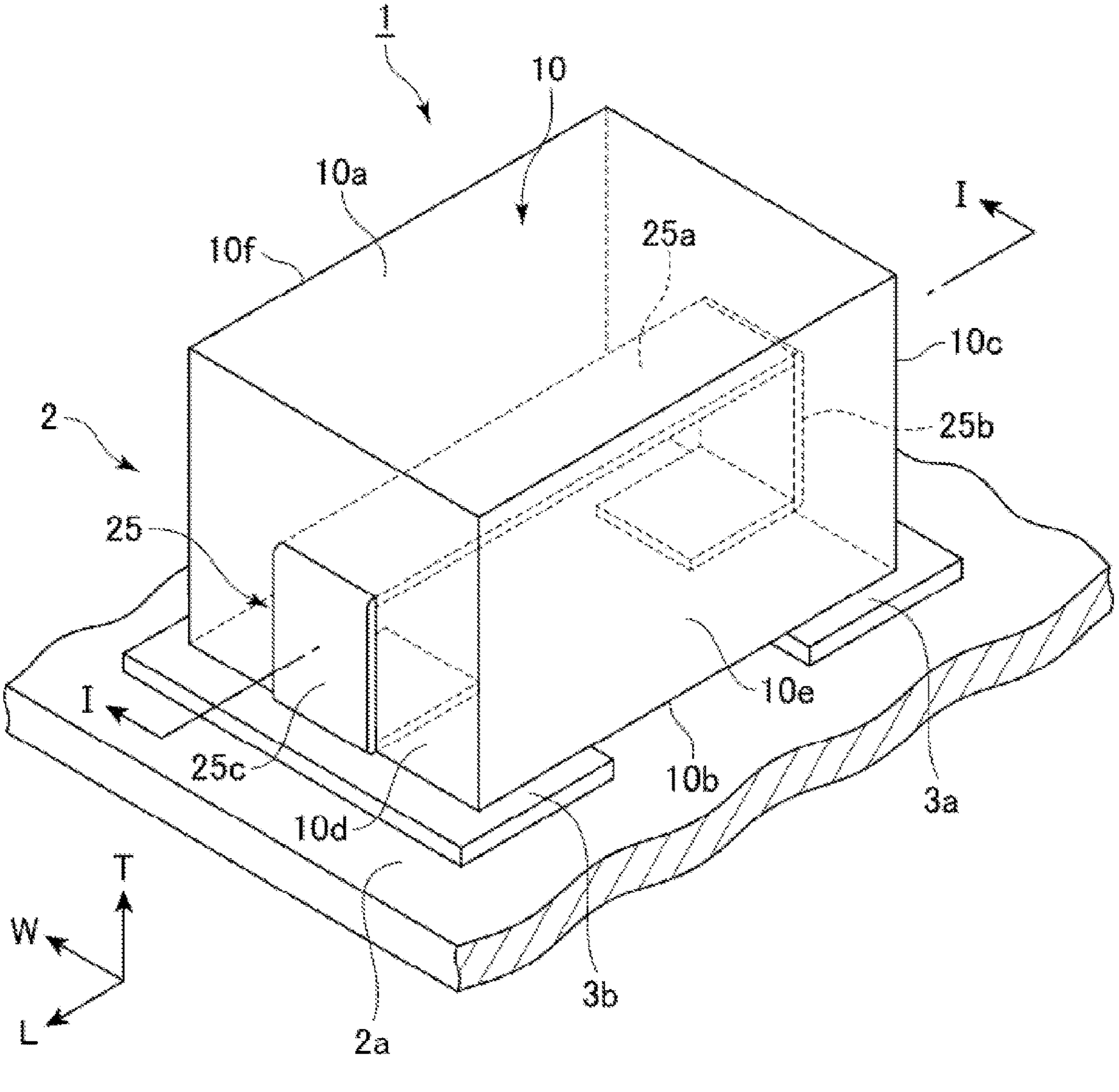
FIG. 1 is a perspective view of a coil component according to one embodiment of the invention, which is mounted on a mounting substrate.
Figure 2:
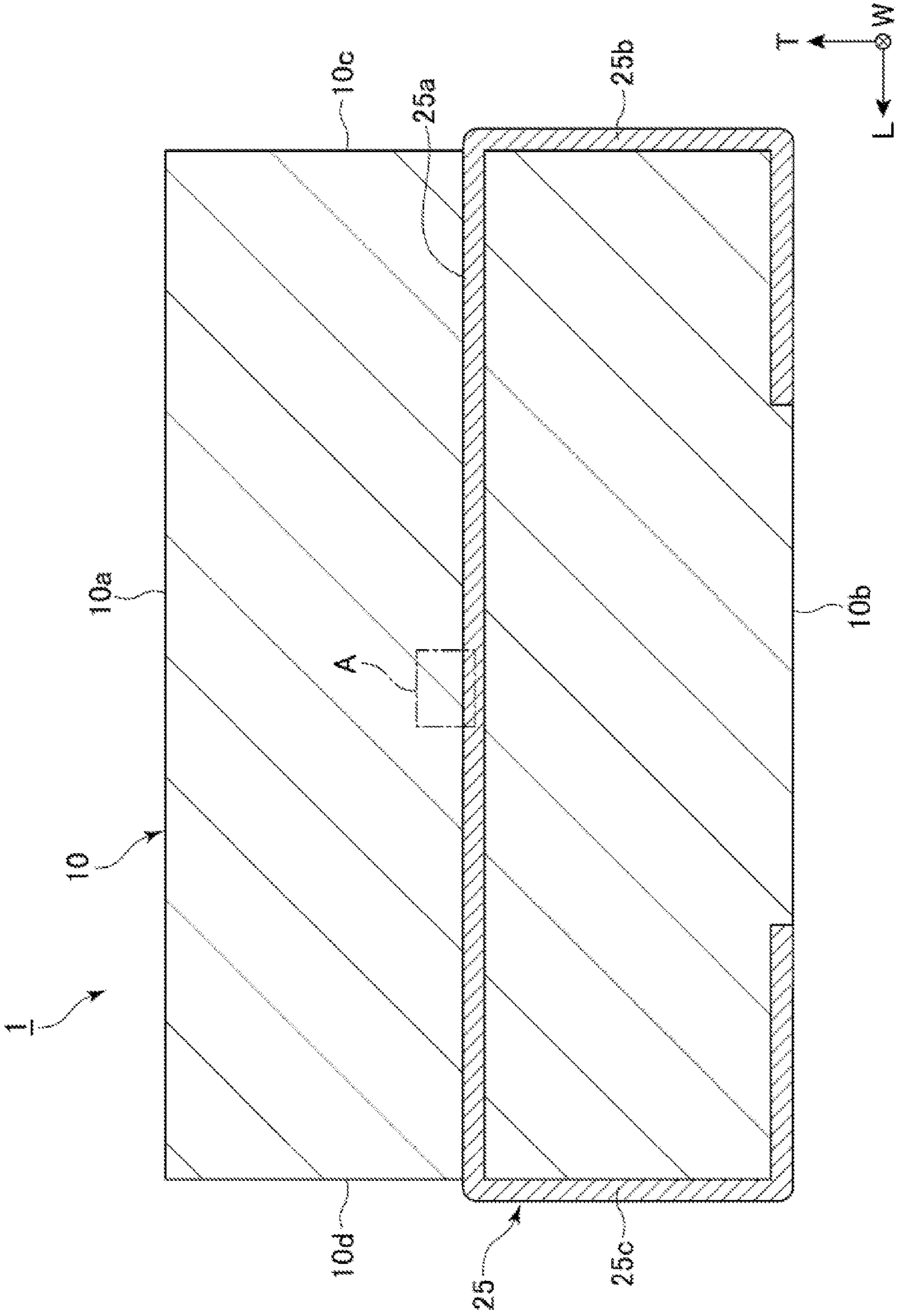
FIG. 2 is a sectional view of the coil component of FIG. 1 along the line I-I.
Figure 3:
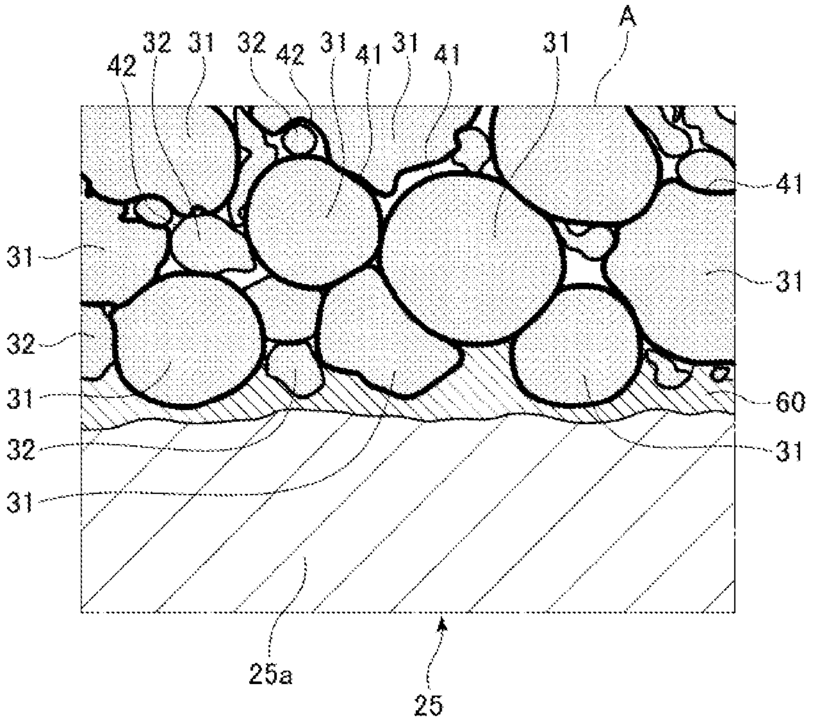
FIG. 3 is an enlarged sectional view showing a part of the section shown in FIG. 2 in an enlarged scale.

A coil component 1 according to one embodiment of the invention will be hereinafter described with reference to FIGS. 1 to 3. FIG. 1 is a perspective view of the coil component 1 mounted on a mounting substrate 2*a*, FIG. 2 is a sectional view of the coil component 1 along the line I-I, and FIG. 3 is an enlarged sectional view showing a part of the section shown in FIG. 2 in an enlarged scale. FIGS. 1 and 2 show a W axis, an L axis, and a Z axis orthogonal to one another. As used herein, the "length" direction, the "width" direction, and the "thickness" direction of the coil component 1 respectively represent the "L-axis" direction, the "W-axis" direction, and the "T-axis" direction in FIG. 1, unless otherwise construed from the context. Herein, orientations and arrangements of the constituent members of the coil component 1 may be described based on the L-, W- and Z-axis directions.

The coil component 1 may be applied to inductors, transformers, filters, reactors, and various other coil components. The coil component 1 may also be applied to coupled inductors, choke coils, and various other magnetically coupled coil components. Applications of the coil component 1 are not limited to those explicitly described herein.

As shown in FIGS. 1 and 3, the coil component 1 includes a base body 10 made of a magnetic material, a coil conductor 25 in the base body 10, and an oxide layer 60 provided between the coil conductor 25 and the base body 10. The coil conductor 25 has a buried portion 25*a* in the base body 10, an exposed portion 25*b* extending outside the base body 10 from one of the ends of the buried portion 25*a* and an exposed portion 25*c* extending outside the base body 10 from the other end of the buried portion 25*a*.

The coil component 1 is mounted on the mounting substrate 2*a*. The mounting substrate 2*a* has lands 3*a* and 3*b* provided thereon. The coil component 1 is mounted on the mounting substrate 2*a* by bonding the exposed portion 25*b* of the coil conductor 25 to the land 3*a* and bonding the exposed portion 25*c* of the coil conductor 25 to the land 3*b*. The coil component 1 and the mounting substrate 2*a* having the coil component 1 mounted thereon constitute a circuit board 2. The circuit board 2 may include the coil component 1 and various other electronic components.

The circuit board 2 can be installed in various electronic devices. The electronic devices in which the circuit board 2 may be installed include smartphones, tablets, game consoles, electrical components of automobiles, servers and various other electronic devices. The electronic devices in which the coil component 1 may be installed are not limited to those specified herein. The coil component 1 may be a built-in component embedded in the circuit board 2.

In the embodiment shown, the base body 10 has a rectangular parallelepiped shape as a whole. The base body 10 has a first principal surface 10*a*, a second principal surface 10*b*, a first end surface 10*c*, a second end surface 10*d*, a first side surface 10*e*, and a second side surface 10*f*, and the six surfaces define the outer surface of the base body 10. The first principal surface 10*a* and the second principal surface 10*b* are opposed to each other, the first end surface 10*c* and the second end surface 10*d* are opposed to each other, and the first side surface 10*e* and the second side surface 10*f* are opposed to each other. In FIG. 1, the first principal surface 10*a* lies on the top side of the base body 10, and therefore, the first principal surface 10*a* may be herein referred to as "the top surface." Similarly, the second principal surface 10*b* may be referred to as a "bottom surface." The magnetic coupling coil component 1 is disposed such that the second principal surface 10*b* faces the mounting substrate 2*a*, and therefore, the second principal surface 10*b* may be herein referred to as "the mounting surface." The top-bottom direction of the coil component 1 refers to the top-bottom direction in FIG. 1. As used herein, the "length" direction, the "width" direction, and the "thickness" direction of the coil component 1 respectively represent the "L axis" direction, the "W axis" direction, and the "T axis" direction in FIG. 1, unless otherwise construed from the context. The L axis, the W axis, and the T axis are orthogonal to one another.

In one or more embodiments of the present invention, the coil component 1 has a length (the dimension in the direction of the L axis) of 1.0 to 12.0 mm, a width (the dimension in the direction of the W axis) of 1.0 to 12.0 mm, and a height (the dimension in the direction of the T axis) of 1.0 to 6.0 mm. The coil component 1 may have a length (the dimension in the direction of the L axis) of 0.2 to 6.0 mm, a width (the dimension in the direction of the W axis) of 0.1 to 4.5 mm, and a height (the dimension in the direction of the T axis) of 0.1 to 4.0 mm. These dimensions are mere examples, and the coil component 1 to which the present invention is applicable can have any dimensions that conform to the purport of the present invention.

The base body 10 is made of a magnetic material. In one or more embodiments of the present invention, the base body 10 contains a plurality of metal magnetic particles. The metal magnetic particles can be particles or powders of a soft magnetic metal material. The metal magnetic particles contain a metal element having a higher ionization tendency than copper. The metal magnetic particles are powders of an Fe—Cr—Si based alloy, for example. Here, Fe and Cr have a higher ionization tendency than copper (Cu). The soft magnetic metal material used to provide the metal magnetic particles is not limited to an Fe—Cr—Si based alloy. The soft magnetic metal material used to provide the metal magnetic particles is, for example, (1) alloys such as Fe—Si—Al or Fe—Ni, (2) amorphous materials such as Fe—Si—Cr—B—C or Fe—Si—B—Cr, or (3) any combination thereof. When the metal magnetic particles are of an alloy-based material, the content of Fe in the metal magnetic particles may be 80 wt % or more but less than 97 wt %. When the metal magnetic particles are of an amorphous material, the content of Fe in the metal magnetic particles may be 72 wt % or more but less than 85 wt %. In the metal magnetic particles, metal elements that are more susceptible to oxidation than Si and Cu may account for, in total, 3 wt % or more, 8 wt % or more, or 10 wt % or more.

In one or more embodiments of the present invention, the particle sizes of the metal magnetic particles contained in the base body 10 are distributed according to a predetermined particle size distribution. The average particle size of the metal magnetic particles is, for example, no less than 1 μm and no more than 10 μm. The average particle size of the metal magnetic particles contained in the base body 10 is determined based on a particle size distribution. To determine the particle size distribution, the base body 10 is cut along the thickness direction (T-axis direction) to expose a section, and the section is scanned by a scanning electron microscope (SEM) to take a photograph at a 1000 to 5000-fold magnification. The SEM photograph is used to determine the particle size distribution of the metal magnetic particles contained in the section. For example, the value at 50 percent of the particle size distribution determined based on the SEM photograph can be set as the average particle size of the metal magnetic particles. The base body 10 may be constituted by metal magnetic particles of a single type or by metal magnetic particles of two or more types made of different materials and/or having different average particle sizes. When the base body 10 is constituted by metal magnetic particles of two or more types, different soft magnetic metal materials may be used to constitute the metal magnetic particles of two or more types. For example, the base body 10 may contain particle mixture obtained by mixing metal magnetic particles of an Fe—Cr—Si based alloy and metal magnetic particles of an Fe—Ni based alloy. When the base body 10 is constituted by metal magnetic particles of two or more types, the metal magnetic particles of two or more types may have different average particle sizes. The fact that the base body 10 contains particle mixture obtained by mixing together metal magnetic particles of two or more types having different average particle sizes can be confirmed by creating a particle size distribution based on a SEM photograph and identifying two or more peaks in the particle size distribution.

The main component of the coil conductor 25 is copper. The term "main component" used herein refers to a component contained at the largest proportion by mass. This means that copper accounts for the largest proportion by mass in the coil conductor 25. The copper content in the coil conductor 25 may be 90 wt % or more, 95 wt % or more, 99 wt % or more, or any higher, in order to lower the electric resistance. In addition to copper, the coil conductor 25 can contain Ni, Sn, Zn and/or other elements. The coil conductor 25 is made of a metal, the main component of which is copper. The coil conductor 25 may be formed by, for example, folding a metal plate or wire. The coil conductor 25 may be made by, for example, firing a paste the main component of which is copper. In the illustrated embodiment, the exposed portion 25*b* of the coil conductor 25 extends from one of the ends of the buried portion 25*a* along the first end surface 10*c* of the base body 10 and extends further from the bottom edge of the first end surface 10*c* along the mounting surface 10*b*. The exposed portion 25*c* of the coil conductor 25 extends from the other end of the buried portion 25*a* along the second end surface 10*d* of the base body 10 and extends further from the bottom edge of the second end surface 10*d* along the mounting surface 10*b*. In other words, the coil conductor 25 illustrated is bent at the boundaries between (i) the buried portion 25*a* and (ii) the exposed portions 25*b* and 25*c*, at the portion overlying the bottom edge of the first end surface 10*c* and at the portion overlying the bottom edge of the second end surface 10*d*. The exposed portions 25*b* and 25*c* applicable to the invention are not limited to the illustrated example. The exposed portions 25*b* and 25*c* can be shaped in any manner and arranged at any position as long as they are exposed through the base body 10. When the exposed portion 25*b* ends before reaching the mounting surface 10*b*, the coil component 1 may include an external electrode (not shown) connected to the exposed portion 25*b*. In this case, the external electrode can be formed using a known external electrode. The external electrode can be formed by, for example, applying a conductive paste onto the surface of the base body 10 to form a base electrode and forming one or more plating layers on the surface of the base electrode. Likewise, when the exposed portion 25*c* ends before reaching the mounting surface 10*b*, the coil component 1 may include an external electrode (not shown) connected to the exposed portion 25*c*. The exposed portions 25*b* and 25*c* themselves may serve as external electrodes. In this case, the exposed portions 25*b* and 25*c* are directly or indirectly connected to the conductive members (for example, the lands 3*a* and 3*b*) of the mounting substrate 2.

The shape of the coil conductor 25 applicable to the invention is not limited to the illustrated shape. The buried portion 25*a* of the coil conductor 25 may be spirally shaped. The spirally shaped buried portion 25*a* may spirally extend around an axis passing through the intersection of the diagonal lines of the first principal surface 10*a*, which is rectangularly shaped as seen from above, and extending perpendicularly to the first principal surface 10*a* (in the T-axis direction). The exposed portions 25*b* and 25*c* may also have other shapes than the illustrated shape. In the coil conductor 25 shown, the buried portion 25*a* has the same sectional shape as the exposed portions 25*b* and 25*c*. The buried portion 25*a* of the coil conductor 25 may have a circular or oval sectional shape. The coil conductor 25 may be made from a wire shaped like a straight line and having a wire diameter of 1.5 mm. The exposed portions 25*b* and 25*c* may be produced by stamping such a wire. The exposed portions 25*b* and 25*c* may have a thickness of, for example, 0.1 mm to 0.5 mm.

In the case of the spirally-shaped buried portion 25*a*, the buried portion 25*a* extends around the coil axis. The spirally-shaped buried portion 25*a* may be wound more than one turn around the coil axis. The coil axis may refer to an imaginary axis extending along one of the T-, L- and W-axes. When the buried portion 25*a* is wound multiple turns around the coil axis, part of the base body 10 may be interposed between adjacent ones of the turns of the buried portion 25*a*. Between adjacent ones of the turns of the buried portion 25*a*, which is wound multiple turns around the coil axis, an insulating material mainly composed of copper oxide may be interposed.

The following now describes the microscopic structure in the vicinity of the boundary between the base body 10 and the buried portion 25*a* of the coil conductor 25 with reference to FIG. 3. FIG. 3 is an enlarged cross-sectional view showing, on an enlarged scale, a region A of the section of the coil component 1 shown in FIG. 2. The region A covers the buried portion 25*a* of the coil conductor 25 and the base body 10. According to the example shown in FIG. 3, the base body 10 contains metal magnetic particles of two types having different average particles sizes, specifically, contains a plurality of first metal magnetic particles 31 and a plurality of second metal magnetic particles 32 having a smaller average particle size than the first metal magnetic particles 31. The first and second metal magnetic particles 31 and 32 may be formed of the same soft magnetic metal material or different soft magnetic metal materials.

An insulating oxide coating film is formed on the surface of the metal magnetic particles included in the base body 10. The insulating oxide coating film contains an oxide of one or more metal elements contained in the metal magnetic particles. As illustrated in FIG. 3, an oxide coating film 41 is provided on the surface of the first metal magnetic particles 31, and an oxide coating film 42 is provided on the surface of the second metal magnetic particles 32. The oxide coating film on the surface of the metal magnetic particles contains an oxide of Fe and other elements constituting the metal magnetic particles. For example, when the metal magnetic particles are formed of an Fe—Cr—Si based alloy, the oxide coating film on the surface of the metal magnetic particles contains an oxide of Fe, Cr and Si. The first metal magnetic particles 31 bind to adjacent ones of the first and second metal magnetic particles 31 and 32 via the oxide coating film 41 and/or the oxide coating film 42.

Between the buried portion 25*a* of the coil conductor 25 and the first and second metal magnetic particles 31 and 32, the oxide layer 60 is provided and covers the surface of the buried portion 25*a*. The oxide layer 60 may be in contact with the buried portion 25*a*. The oxide layer 60 is provided between the buried portion 25*a* and the first and second metal magnetic particles 31 and 32 such that the oxide layer 60 can fill the space between the buried portion 25*a* and the first and second metal magnetic particles 31 and 32. The oxide layer 60 is in contact with the first metal magnetic particles 31 via the oxide coating film 41 and with the second metal magnetic particles 32 via the oxide coating film 42. There may be voids between the oxide layer 60 and the first and/or second metal magnetic particles 31, 32.

As illustrated, the oxide layer 60 may cover the entire surface of the buried portion 25*a*. For example, the oxide layer 60 can be deemed to cover the entire surface of the buried portion 25*a* in the following manner. The base body 10 is cut along the T-axis to expose a section at three (five or more) sites evenly spaced away from each other in the L-axis direction, and the exposed sections are image-captured using the SEM technique at a 5000-fold magnification such that the obtained SEM photographs can include part of the surface of the buried portion 25*a* and the base body 10. If the entire surface of the buried portion 25*a* is covered with the oxide layer 60 in every one of the SEM photographs, the oxide layer 60 can be deemed to cover the entire surface of the buried portion 25*a*. As described above, the oxide layer 60 covers the surface of the buried portion 25*a* of the coil conductor 25 and fills the space between the buried portion 25*a* and the first and second metal magnetic particles 31 and 32. Accordingly, the present embodiment can partly or totally prevent, when the coil component 1 is in use, the ambient air and the moisture in the air from entering the base body 10 and reaching the buried portion 25*a*.

In one or more embodiments of the present invention, the oxide layer 60 contains an oxide of the metal element contained in at least one of the first metal magnetic particles 31 or the second metal magnetic particles 32. For example, if the first and second metal magnetic particles 31 and 32 are formed of an Fe—Cr—Si based alloy, the oxide layer 60 includes an oxide of at least one element selected from the group consisting of Fe and Cr. Since the oxide layer 60 contains an oxide of the metal element contained in at least one of the first metal magnetic particles 31 or the second metal magnetic particles 32, the relative permeability of the oxide layer 60 is higher than the relative permeability of the conventional resin (for example, polyimide) insulating coating film. The oxide layer 60 may contain an oxide of the other elements (for example, Si) constituting the first and second metal magnetic particles 31 and 32 than the metal elements. When the base body 10 is formed of metal magnetic particles of a single type, the oxide layer 60 contains at least one metal element selected from the group consisting of one or more metal elements contained in the metal magnetic particles. For example, when the metal magnetic particles of a single type contained in the base body 10 is formed of an Fe—Cr—Si based alloy, the oxide layer 60 includes at least one of Fe element or Cr element. When the base body 10 is constituted by metal magnetic particles of two or more types, the oxide layer 60 contains at least one metal element selected from the group consisting of one or more metal elements contained in the metal magnetic particles of the two or more types. For example, when the base body 10 contains metal magnetic particles of a first type formed of an Fe—Cr—Si based alloy and metal magnetic particles of a second type formed of an Fe—Ni based alloy, the oxide layer 60 contains at least one of Fe element, Cr element or Ni element.

In one or more embodiments of the present invention, the oxide layer 60 may contain copper element in addition to an oxide of the metal element contained in at least one of the first metal magnetic particles 31 or the second metal magnetic particles 32. The oxide layer may contain copper element in the form of copper oxide.

When the section of the base body 10 is image-captured at a 5,000- to 20,000-fold magnification using the SEM technique, the resulting SEM photograph shows that the difference in brightness can help specify the boundary between the oxide layer 60 and the buried portion 25*a* of the coil conductor 25 and the boundary between the oxide layer 60 and the first and second metal magnetic particles 31 and 32. It can be proved that the oxide layer 60 contains an oxide of the metal element contained in at least one of the first metal magnetic particles 31 or the second metal magnetic particles 32 by subjecting the section of the base body 10 to energy dispersive X-ray spectroscopy (EDS). More specifically, if the EDS performed on the section of the base body 10 can confirm that the oxide layer 60 contains oxygen element and a metal element contained in at least one of the first metal magnetic particles 31 or the second metal magnetic particles 32, this can prove that the oxide layer 60 contains an oxide of the metal element contained in at least one of the first metal magnetic particles 31 or the second metal magnetic particles 32. The EDS performed on the section of the base body 10 can produce mapping data for each element. As the mapping data is reorganized along the scanning line transverse the oxide layer 60 (for example, the line extending in the T-axis direction), the metal element contained in at least one of the first metal magnetic particles 31 or the second metal magnetic particles 32 may increase in abundance along the scanning line as the distance from the buried portion 25*a* increases (toward the first and second metal magnetic particles 31 and 32). In other words, the detected abundance of the metal element contained in at least one of the first metal magnetic particles 31 or the second metal magnetic particles 32 may grow as the distance from the buried portion 25*a* increases. On the other hand, the detected abundance of copper along the same scanning line may grow as the distance from the buried portion 25*a* decreases.

The oxide layer 60 is highly insulating. The oxide layer 60 exhibits excellent insulation since it contains hematite, silicon dioxide, and/or other insulating oxides. The oxide layer 60 has a high specific resistance of $10^8$ Ω·cm or greater, for example. Since the surface of the buried portion 25*a* of the coil conductor 25 is covered with the insulating oxide layer 60 as described above, the present embodiment can reduce occurrence of short circuits between the coil conductor 25 and the first and second metal magnetic particles 31 and 32. In other words, the coil component 1 has high dielectric strength.

When the buried portion 25*a* is spirally shaped as described above, part of the base body 10 may be interposed between adjacent ones of the turns of the buried portion 25*a*. In this case, the oxide layer 60 is provided between the surface of the buried portion 25*a* and the region of the base body 10 that is interposed between the adjacent ones of the turns of the buried portion 25*a*. Since the insulating oxide layer 60 separates the adjacent turns from each other, the present embodiment can reduce occurrence of short circuits between portions of the coil conductor 25 that constitute different ones of the turns. Accordingly, the coil component 1 has high dielectric strength.

When the buried portion 25*a* is spirally shaped, it may not be part of the base body 10 but an insulating member mainly composed of copper oxide that is interposed between adjacent ones of the turns of the buried portion 25*a*. The insulating member mainly composed of copper oxide can reduce occurrence of short circuits between portions of the coil conductor 25 that constitute different ones of the turns.

In one or more embodiments of the present invention, the oxide layer 60 contains zinc element. The oxide layer 60 may contain zinc element in the form of zinc oxide. In the oxide layer 60, zinc element accounts for, for example, 1.0 at % to 25 at %. Here, zinc element may constitute at least one of the oxide coating film 41 of the first metal magnetic particles 31 or the oxide coating film 42 of the second metal magnetic particles 32. In one or more embodiments, the content (atomic percentage) of zinc element is higher in the oxide layer 60 than in the oxide coating film 41 and in the oxide coating film 42. As containing zinc oxide, the oxide layer 60 can be densified. This can further contribute to prevent the oxygen and moisture in the ambient air from reaching the buried portion 25*a* while the coil component 1 is in use.

Figure 4:
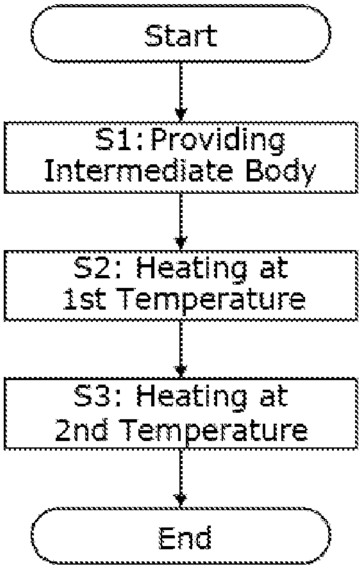
FIG. 4 is a flow chart showing a process of manufacturing the coil component according to one embodiment of the present invention.

The following now describes an example method of manufacturing the coil component 1 relating to one embodiment of the present invention with reference to FIGS. 4 to 7. FIG. 4 is a flow chart showing a process of manufacturing the coil component 1 according to one embodiment of the present invention. In the following, it is assumed that the coil component 1 is manufactured by the compression molding process. The coil component 1 may be manufactured by any known methods in addition to the compression molding process. For example, the coil component 1 may be manufactured by a sheet stacking method, a printing stacking method, a thin-film process method, or a slurry build method.

Figure 5:
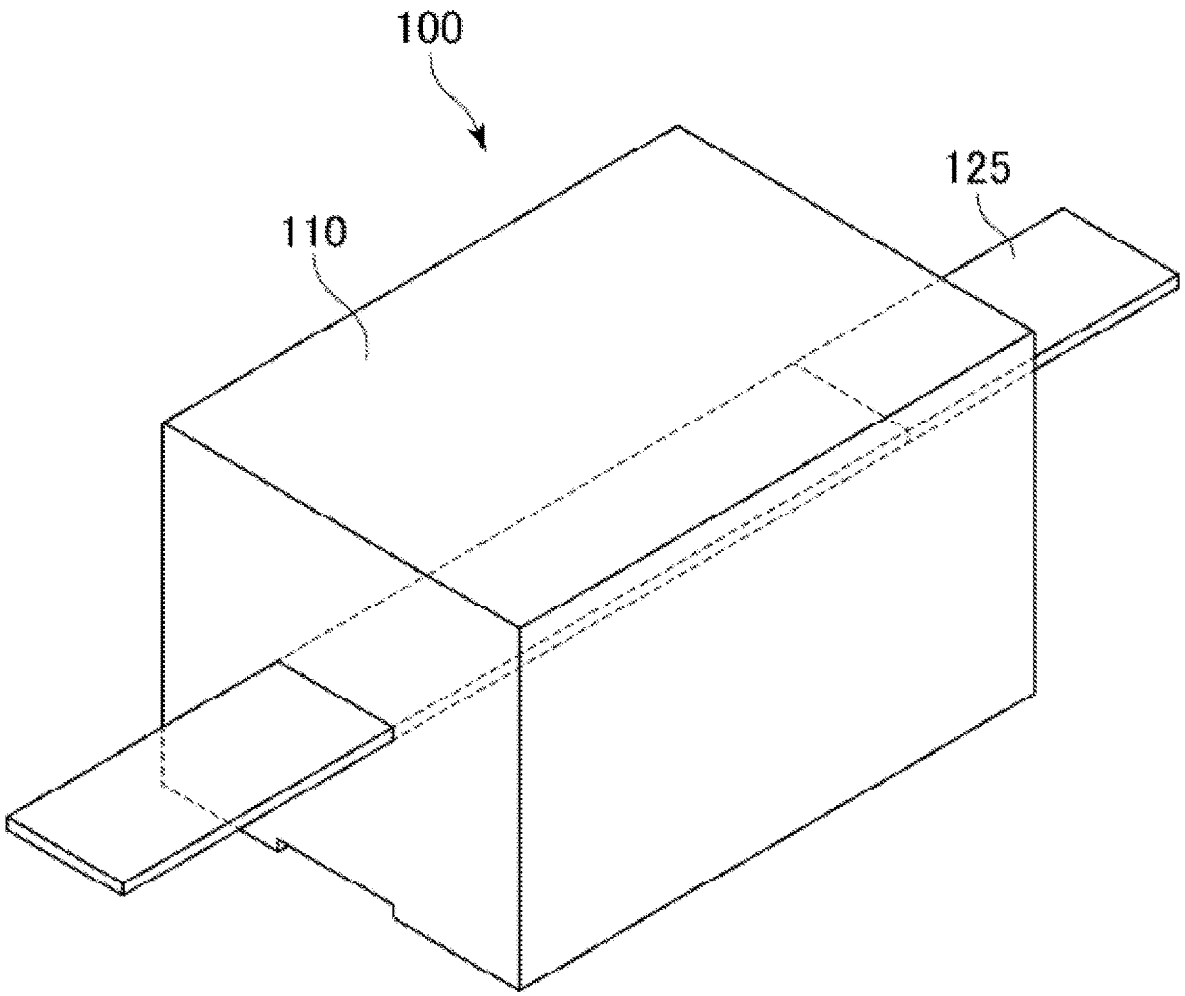
FIG. 5 is a perspective view schematically showing an intermediate body, which is produced during the process of manufacturing the coil component in one or more embodiments of the invention.

In the first step S1, an intermediate body 100 is fabricated. As described below, the intermediate body 100 will be subsequently subjected to heating. The intermediate body 100 is schematically shown in FIG. 5. As shown, the intermediate body 100 includes a substrate body 110 made from a magnetic material and a conductor portion 125 partly buried in the substrate body 110 and mainly composed of copper. In the illustrated embodiment, the conductor portion 125 is a metal plate mainly composed of copper. A resin insulating coating film may or may not be provided on the surface of the conductor portion 125. A suspension, which contains zinc oxide (ZnO) powders dispersed in alcohol, may be applied to a region of the surface of the conductor portion 125 that is buried in the substrate body 110. In place of the above-mentioned copper plate member, a copper wire may be used as the conductor portion 125.

The intermediate body 100 is fabricated by arranging the conductor portion 125 in a mold, pouring a metal magnetic paste containing metal magnetic particles into the mold where the conductor portion 125 is placed, and applying predetermined molding pressure (for example, 500 kN to 5000 kN) to the metal magnetic paste in the mold. In this manner, the metal magnetic paste is shaped into the substrate body 110, with the conductor portion 125 being partly buried in the substrate body 110. In one embodiment, the molding pressure is adjusted such that the substrate body 110 can have an apparent density of 6.0 g/cm$^3$. The magnetic paste can be produced by mixing and kneading together metal magnetic particles such as Fe—Cr—Si based alloy powders with a binder resin and a solvent. The metal magnetic particles may include two or more types of metal magnetic particles having different particle sizes from each other. The binder resin is, for example, an acrylic resin or other known resins.

As mentioned above, the coil component 1 may be manufactured by a variety of methods in addition to the compression molding process. In the step S1, the intermediate body 100, which includes the conductor portion 125 mainly composed of copper and the substrate body 110 containing the metal magnetic particles, with the conductor portion 125 being buried in the substrate body 110, may be fabricated using any methods other than the above-described compression molding technique. The intermediate body 100 can be manufactured, for example, by a sheet stacking method. To fabricate the intermediate body 100 using a sheet stacking method, metal magnetic particles and a thermally decomposable binder resin (the binder resin is, for example, an acrylic resin or any other known resins) are mixed and kneaded to produce a slurry, and the slurry is manufactured into a plurality of magnetic sheets using a variety of types of sheet molding machines such as a die coater sheet molding machine. Subsequently, a thorough hole is formed in each magnetic sheet at a predetermined position using a laser processing machine or other machines, and a conductive paste containing a conductive material such as copper is applied in a desired pattern onto the magnetic sheet having the through hole formed therein. In this manner, the magnetic sheet can have a conductor pattern formed thereon. This step results in the through hole formed in the magnetic sheet being filled with the conductive paste. The conductive paste is applied by, for example, screen printing. Next, the magnetic sheets each with the conductor pattern formed thereon are stacked together in a predetermined order and heated while being compressed at, for example, 80° C. and 300 kN, so that the intermediate body 100 is provided.

Figure 6:
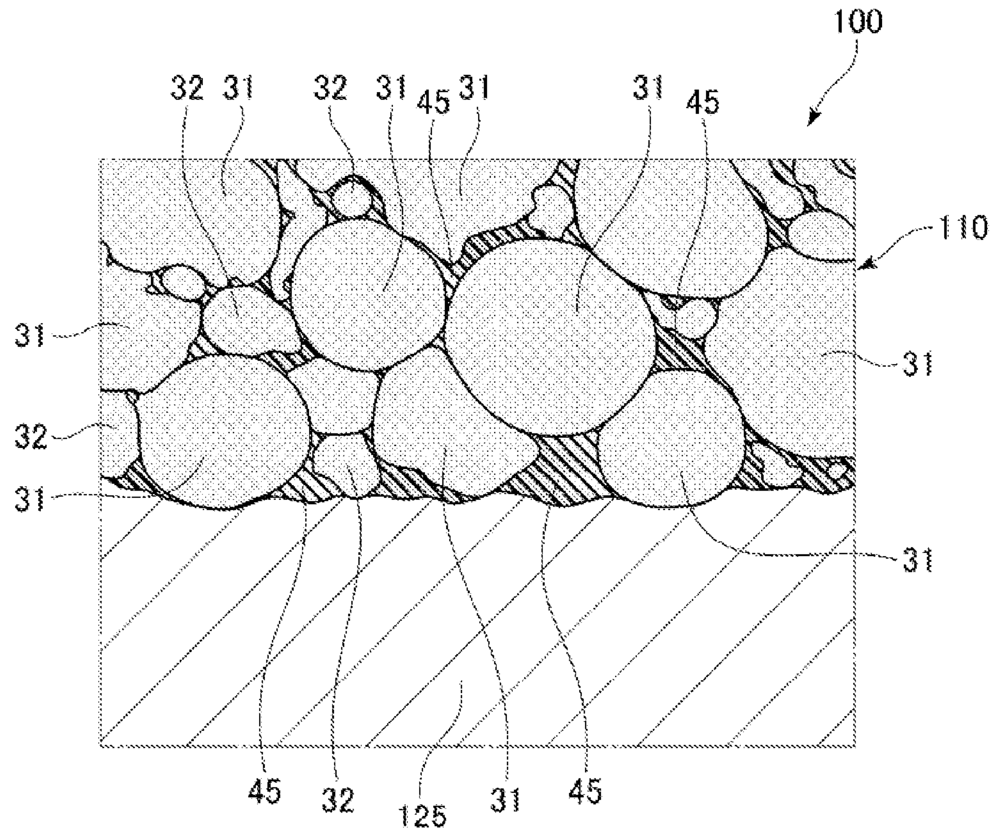
FIG. 6 is an enlarged sectional view showing, in an enlarged scale, part of the section of the intermediate body before it is heated in a first heating treatment during the process of manufacturing the coil component according to one embodiment of the present invention.

FIG. 6 shows, at an enlarged scale, a partial region of the section of the intermediate body 100 fabricated in the step S1 that is obtained by cutting the intermediate body 100 along the T-axis. The region shown in FIG. 6 corresponds to the region A in FIG. 2. As shown in FIG. 6, the substrate body 110 contains the first metal magnetic particles 31 and the second metal magnetic particles 32 having a smaller average particle size than the first metal magnetic particles 31. The binder resin, which is indicated by the reference numeral 45, fills the gaps between adjacent ones of the metal magnetic particles and the space between the conductor portion 125 and the metal magnetic particles. In the embodiment shown, the conductor portion 125 has no resin insulating coating film. Accordingly, the conductor portion 125 is in contact with the first and second metal magnetic particles 31 and 32 directly or via the binder resin 45. As described above, the surface of the conductor portion 125 may be covered with an insulating coating film made of a thermally decomposable resin. In this case, the conductor portion 125 is in contact with the first and second metal magnetic particles 31 and 32 via the resin insulating coating film or via the resin insulating coating film and the binder resin 45.

In the following step S2, the intermediate body 100 fabricated in the step S1 is subjected to a first heating treatment. More specifically, the intermediate body 100 is placed in a heating furnace, and heated in the heating furnace, for example, at 250° C. to 350° C., within an air atmosphere, and for 30 to 120 minutes. The first heating treatment decomposes the binder resin 45 and forms a copper oxide film 50 containing copper oxide on the surface of a part of the conductor portion 125 that is buried in the substrate body 110. When the surface of the conductor portion 125 is covered with the insulating coating film made of a thermally decomposable resin, the first heating treatment heats the intermediate body 100 to a temperature equal to or higher than the thermal decomposition temperature of the resin constituting the insulating coating film on the surface of the conductor portion 125. As a result, the insulating coating film on the surface of the conductor portion 125 is thermally decomposed in the first heating treatment, so that the copper oxide film 50 containing copper oxide is formed on the surface of the portion of the conductor portion 125 that is buried in the substrate body 110. As noted, when the conductor portion 125 is covered with the resin insulating coating film, the region that surrounds the conductor portion 125 and that is occupied by the resin insulating coating film before the first heating treatment is not formed into voids but filled with the copper oxide film 50. Since the first heating treatment is performed within an oxygen atmosphere, the first heating treatment facilitates oxidation of the copper contained in the conductor portion 125, so that the copper oxide film 50 is formed on the surface of the conductor portion 125 to fill the voids resulting from the decomposition of the binder resin 45 and the resin insulating coating film.

The portion of the conductor portion 125 that is buried in the substrate body 110 may be spirally shaped. When the conductor portion 125 has the insulating coating film on the surface thereof and the portion of the conductor portion 125 that is buried in the substrate body 110 is spirally shaped, the first heating treatment thermally decomposes the insulating coating film and the space occupied by the insulating coating film before the thermal decomposition is filled with the copper oxide produced by the oxidation of the copper contained in the conductor portion 125. In other words, when the conductor portion 125 having the insulating coating film is buried in the substrate body 110, the copper oxide film 50 is also present between the adjacent ones of the turns of the spirally-shaped conductor portion 125. As interposed between the adjacent turns, the copper oxide film 50 can prevent short circuits from occurring between the adjacent turns of the conductor portion 125.

The main component of the copper oxide film 50 may be copper oxide (CuO). As described above, the first heating treatment degreases the substrate body 110 and oxidizes the surface of the conductor portion 125. The heating conditions of the first heating treatment may be adapted such that the copper oxide film 50 has a thickness of 0.1 μm or more. The heating conditions of the first heating treatment are determined such that the metal magnetic particles contained in the substrate body 110 are not oxidized into an oxide coating film on the surface of the metal magnetic particles. When the first heating treatment is performed at a temperature of 250 to 350° C., the first and second metal magnetic particles 31 and 32 are constituted by a material that does not form an oxide coating film on the surface thereof at the heating temperature of the first heating treatment.

When a zinc oxide (ZnO) suspension is applied onto the surface of the conductor portion 125 in the step S1, the zinc oxide on the surface of the conductor portion 125 is taken into the copper oxide film 50 during the formation of the copper oxide film 50 on the surface of the conductor portion 125.

Figure 7:
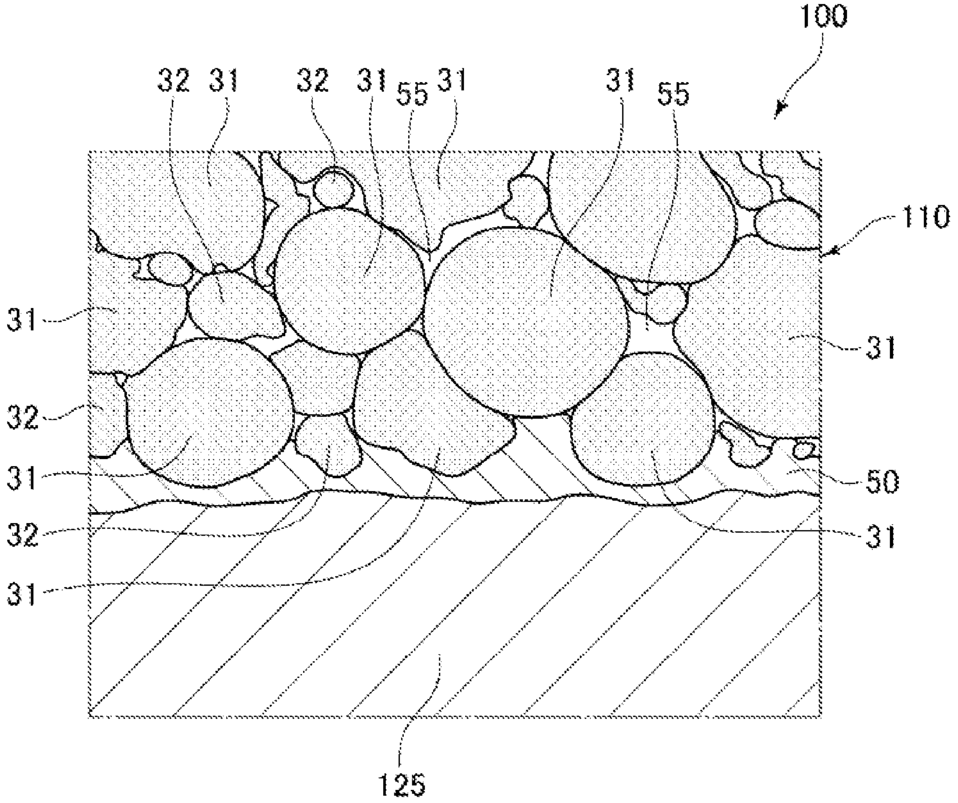
FIG. 7 is an enlarged sectional view showing, in an enlarged scale, part of the section of the intermediate body after it is heated in the first heating treatment but before it is heated in a second heating treatment during the process of manufacturing the coil component according to one embodiment of the invention.

FIG. 7 shows, at an enlarged scale, a partial region of the section of the intermediate body 100 that is obtained by cutting the intermediate body 100 along the T-axis, which is observed after the first heating treatment in the step S2. As illustrated, since the first heating treatment decomposes the binder resin, the region filled with the binder resin 45 before the first heating treatment, more specifically, the gaps between adjacent ones of the metal magnetic particles are turned into voids 55. Here, the binder resin 45 that fills the space between the conductor portion 125 and the metal magnetic particles is similarly decomposed, but the space between the conductor portion 125 and the metal magnetic particles is not turned into a void but filled with the copper oxide film 50. Since the first heating treatment is performed within an oxygen atmosphere, the first heating treatment facilitates oxidation of the copper contained in the conductor portion 125, so that the copper oxide film 50 is formed on the surface of the conductor portion 125 to fill the voids resulting from the decomposition of the binder resin 45. The copper oxide film 50 may be formed such that it covers the entire region of the surface of the conductor portion 125 that is in contact with the substrate body 110.

In the following step S3, the intermediate body 100, which has been subjected to the first heating treatment, is subjected to a second heating treatment. The second heating treatment is performed within a lower oxygen concentration atmosphere that is lower in oxygen concentration than the atmosphere in the first heating treatment and at a higher temperature than in the first heating treatment. The second heating treatment oxidizes the first and second metal magnetic particles 31 and 32 contained in the substrate body 110, as a result of which the oxide coating film 41 is formed on the surface of the first metal magnetic particles 31 and the oxide coating film 42 is formed on the surface of the second metal magnetic particles 32. Since the first and second metal magnetic particles 31 and 32 contain a metal element that has a higher ionization tendency than copper, the copper oxide contained in the copper oxide film 50 is partly or entirely reduced when the first or second metal magnetic particles 31, 32 near the copper oxide film 50 produce an oxide of the metal element that has a higher ionization tendency than copper. Since the second heating treatment is performed within a lower oxygen concentration atmosphere, the metal element contained in the first and second metal magnetic particles 31 and 32 near the copper oxide film 50 in the substrate body 110 takes oxygen away from the oxide copper and produces an oxide. As described above, the second heating treatment reduces the copper oxide contained in the copper oxide film 50, so that the copper oxide film 50 is formed into the oxide layer 60. Unlike the copper oxide film 50, the main component of the oxide layer 60 is not copper oxide. If the second heating treatment reduces only part of the copper oxide contained in the copper oxide film 50, the oxide layer 60 still contains the copper oxide in the copper oxide film 50. The oxide layer 60 contains an oxide of the metal element contained in at least one of the first metal magnetic particles 31 or the second metal magnetic particles 32. The oxide layer 60 may contain copper element, which is in the form of copper oxide before the second heating treatment.

As described above, when the conductor portion 125 having the insulating coating film on the surface thereof has a portion buried in the substrate body 110 and the buried portion has a spiral shape, the copper oxide film 50 is provided between adjacent ones of the turns of the spirally-shaped conductor portion 125. The copper oxide contained in the copper oxide film 50 interposed between adjacent ones of the turns of the spirally-shaped conductor portion 125 is at a large distance from the first or second metal magnetic particles 31, 32 and is thus less likely to be reduced by the metal element having a higher ionization tendency than copper and contained in the first or second metal magnetic particles 31, 32. For this reason, relatively more copper oxide remains in the region of the copper oxide film 50 that is between adjacent ones of the turns of the spirally-shaped conductor portion 125 than in the other region of the copper oxide film 50 that is adjacent to the first or second metal magnetic particles 31, 32. When thermal diffusion causes the metal element (for example, Fe or Cr) that has a higher ionization tendency than copper and that is contained in the first or second metal magnetic particles 31, 32 to move and reach even the region between adjacent ones of the turns of the spirally-shaped conductor portion 125, the metal element that has a higher ionization tendency than copper may also reduce the copper oxide between adjacent ones of the turns of the spirally-shaped conductor portion 125. In other words, the copper oxide film 50 present between adjacent ones of the turns of the spirally-shaped conductor portion 125 may be partly reduced by the second heating treatment to the oxide layer 60.

When the step S1 applies a zinc oxide (ZnO) suspension onto the surface of the conductor portion 125, the resulting oxide layer 60 contains zinc oxide in addition to the oxide of the metal element contained in at least one of the first metal magnetic particles 31 or the second metal magnetic particles 32. The zinc oxide can contribute to densify the oxide layer 60, which results from the second heating treatment.

The second heating treatment is performed at a temperature of approximately 600° C. to 900° C., within a mixed atmosphere of nitrogen and oxygen for a duration of 30 to 120 minutes, for example. The oxygen concentration in the mixed atmosphere is 100 ppm to 2000 ppm. The researches done by the inventors of the present invention have discovered the following. If a distance of 2 mm or more is provided in the intermediate body 100 between the copper oxide film 50 and the surface of the substrate body 110, heating the intermediate body within a mixed atmosphere of nitrogen and oxygen with an oxygen concentration of 2000 ppm, at a temperature of approximately 800° C., and for a duration of 60 minutes can entirely reduce the copper oxide contained in the copper oxide film 50 having a thickness of 0.5 μm.

When the copper oxide film 50 contains zinc oxide, the second heating treatment reduces at least part of the zinc oxide. Since the melting point of zinc is lower than the heating temperature of the second heating treatment, the second heating treatment melts the zinc, which results from the reduction. When there are voids between the copper oxide film 50 and the metal magnetic particles 31 and/or the metal magnetic particles 32, the melted zinc moves into the voids and can thus fill at least part of the voids. In this manner, the second heating treatment can result in fewer voids between the oxide layer 60 and the first metal magnetic particles 31 or/and the second metal magnetic particles 32. Accordingly, the present embodiment can further prevent, when the coil component 1 is in use, the ambient air and the moisture in the air from reaching the buried portion 25*a*.

Subsequently, the portion of the conductor portion 125 that is exposed through the base body 10 is bent so as to extend along the surface of the base body 10. As a result, the coil conductor 25 is completed. The coil conductor 25 is made by bending the conductor portion 125. The bent portion of the conductor portion 125 constitutes the exposed portions 25*b* and 25*c*. When a copper wire is used in place of the conductor portion 125, a portion of the wire that is exposed through the base body 10 is stamped into a plate-shaped member, and the plate-shaped member is bent into the exposed portions 25*b* and 25*c*. In another embodiment of the present invention, the exposed portions 25*b* and 25*c* may be exposed through the mounting surface 10*b* of the base body 10. In this case, the exposed portions 25*b* and 25*c* can be respectively connected to the lands 3*a* and 3*b* without requiring that the conductor portion 125 be bent. In other words, the exposed portions 25*b* and 25*c* of the coil conductor 25 can serve as the external electrodes without requiring that the conductor portion 125 be bent.

In the above-described manner, the coil component 1 is produced. The method of manufacturing the coil component 1 may include additional steps in addition to the steps S1 to S3. For example, the base body 10 fabricated by the heating treatment step is subjected to a polishing treatment such as barrel polishing as necessary. Additionally, some of the steps S1 to S3 may be performed in parallel or reordered. For example, the bending of the conductor portion 125 may be performed before the first heating treatment in the step S2 or between the steps S2 and S3. The method of manufacturing the coil component 1 may include additional steps in addition to the steps S1 to S3. For example, external electrodes may be provided on the base body 10 in a known manner. The external electrodes are electrically connected to the portions of the coil conductor 25 that are exposed through the base body 10.

Next, advantageous effects of the foregoing embodiments will be described. In one or more embodiments of the present invention, the surface of the buried portion 25*a* of the coil conductor 25 is covered with the insulating oxide layer 60. Accordingly, the present embodiment can prevent occurrence of short circuits between the coil conductor 25 and the metal magnetic particles contained in the base body 10 (for example, the first and second metal magnetic particles 31 and 32). The oxide layer 60 covers the surface of the buried portion 25*a* of the coil conductor 25 and fills the space between the coil conductor 25 and the metal magnetic particles constituting the base body 10. Accordingly, the present embodiment can prevent the ambient air and the moisture in the air from entering the base body 10 and reaching the coil conductor 25. Since the oxide layer 60 contains an oxide of the metal element constituting the metal magnetic particles, the relative permeability of the oxide layer 60 is higher than the relative permeability of the conventional resin insulating coating film. The coil component 1 described above can thus provide for high dielectric strength and high resistance against oxidation and also reduce compromise of the magnetic characteristics as it includes the oxide layer 60.

In one or more embodiments of the present invention, the oxide layer 60 contains zinc oxide, which can contribute to densify the oxide layer 60. This can further prevent ambient air and moisture in the air from reaching the coil conductor 25.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the embodiments described, and it is also possible to omit some of the constituent elements described for the embodiments.

The words "first," "second," and "third" used herein are added to distinguish constituent elements but do not necessarily limit the number, order, or details of the constituent elements. The numbers added to distinguish the constituent elements should be construed in each context. The same numbers do not necessarily denote the same constituent elements among the contexts. The use of numbers to identify constituent elements does not prevent the constituents from performing the functions of the constituent identified by other numbers.

What is claimed is:

1. A coil component comprising:

a base body including a plurality of metal magnetic particles, each metal magnetic particle containing a metal element, each of the plurality of metal magnetic particles being covered by an oxide coating film;

a coil conductor including a buried portion provided in the base body and an exposed portion externally exposed through the base body, the coil conductor being mainly made of copper; and an insulating oxide layer formed between the buried portion and the oxide coating film of some of the plurality of metal magnetic particles that are located adjacent to the buried portion, the insulating oxide layer covering a surface of the buried portion, the oxide layer containing copper element and an oxide of the metal element contained in the metal magnetic particles.

2. The coil component of claim 1, wherein each of the metal magnetic particles contains a metal element having a higher ionization tendency than copper.

3. The coil component of claim 1, wherein each of the metal magnetic particles has an oxide coating film on a surface thereof and binds to an adjacent one of the metal magnetic particles via the oxide coating film.

4. The coil component of claim 1, wherein each of the metal magnetic particles has an oxide coating film on a surface thereof, and some of the metal magnetic particles are in contact with the coil conductor via the oxide layer and the oxide coating film.

5. The coil component of claim 1, wherein the oxide layer contains zinc element.

6. The coil component of claim 5, wherein each of the metal magnetic particles has an oxide coating film on a surface thereof, and a zinc element content is higher in the oxide layer than in the oxide coating film.

7. The coil component of claim 5, wherein an atomic percentage of zinc in the oxide layer is 1.0 at % to 25 at %.

8. A circuit board comprising the coil component of claim 1.

9. An electronic device comprising the circuit board of claim 8.

* * * * *